United States Patent [19]

Lott

[11] Patent Number: 4,634,535

[45] Date of Patent: Jan. 6, 1987

[54] DRILLING MUD CLEANING METHOD AND APPARATUS

[76] Inventor: W. Gerald Lott, 1857 Post Oak Pk. Dr., Houston, Tex. 77027

[21] Appl. No.: 715,379

[22] Filed: Mar. 25, 1985

[51] Int. Cl.⁴ .................... B01D 33/22; B01D 36/00
[52] U.S. Cl. ................................. 210/780; 210/788; 210/805; 210/806; 210/257.1; 210/258; 210/297; 210/512.2; 209/311
[58] Field of Search .............. 210/780, 788, 805, 806, 210/257.1, 258, 259, 260–262, 294, 297, 389, 512.2; 55/182, 190–193; 209/311, 405, 413

[56] References Cited

U.S. PATENT DOCUMENTS

| | | | |
|---|---|---|---|
| 2,312,477 | 3/1943 | Pollitz | 210/389 |
| 2,750,043 | 6/1956 | Thompson | 210/389 |
| 2,919,898 | 1/1960 | Marwil et al. | 210/788 |
| 3,616,599 | 11/1971 | Burnham, Sr. | 210/389 |
| 3,684,091 | 8/1972 | Wehner | 210/499 |
| 3,988,243 | 10/1976 | Huff | 210/389 |
| 4,019,980 | 4/1977 | Beery | 210/512.2 |
| 4,247,312 | 1/1981 | Thakur | 55/193 |
| 4,486,302 | 12/1984 | Jorgensen | 209/405 |
| 4,568,461 | 2/1986 | Aoustin et al. | 210/519 |

Primary Examiner—John Adee
Attorney, Agent, or Firm—Guy E. Matthews

[57] ABSTRACT

A mud slurry cleaning method including steps of distributing a mud slurry across an inclined primary separation screen, vibrating the primary screen through selected movement, cycle and frequency to screen out the liquid and selected particles, concurrently changing the geometric shape of the openings of the primary screen through each vibration cycle to free particles as might tend to lodge while concurrently impacting the primary screen at many spaced apart impact points to loosen particles tending to lodge, cyclonically separating the screened mud into a finally cleaned slurry and a thickened slurry including particles originally included in the original slurry, mixing the thickened slurry with a portion of the screened slurry to form a liquified slurry, distributing the liquified slurry across an inclined gleaning screen, and vibrating the gleaning screen as above described to screen out liquid and desired particles while concurrently changing the geometric shape of the openings of the screen and concurrently impacting the screen to loosen particles as above described. Mixing the clean slurry from the hydrocyclone separators with the liquid coming through the gleaned screen for return for use in the wellbore. Also discloses specialized apparatus used in the method.

26 Claims, 12 Drawing Figures

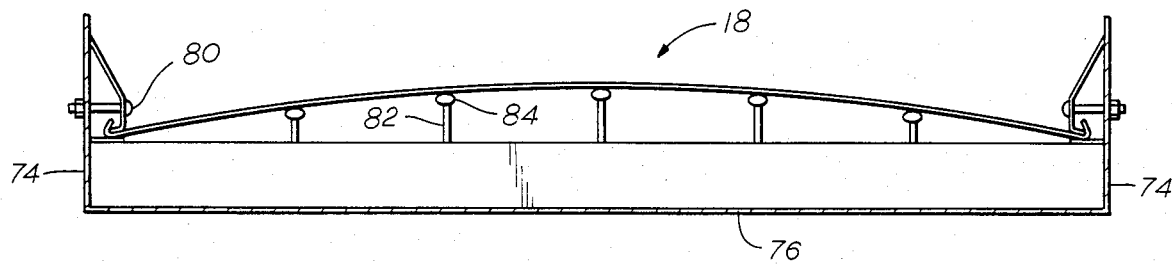
FIG. 6
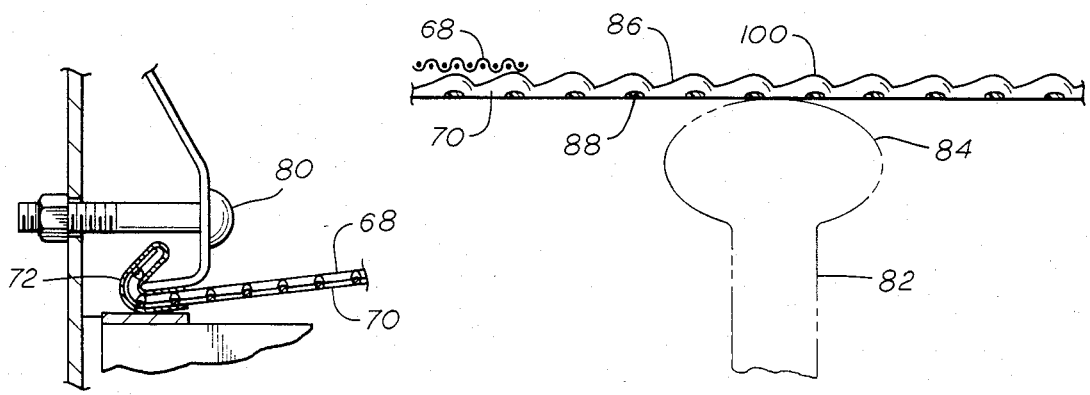
FIG. 7     FIG. 8
FIG. 9
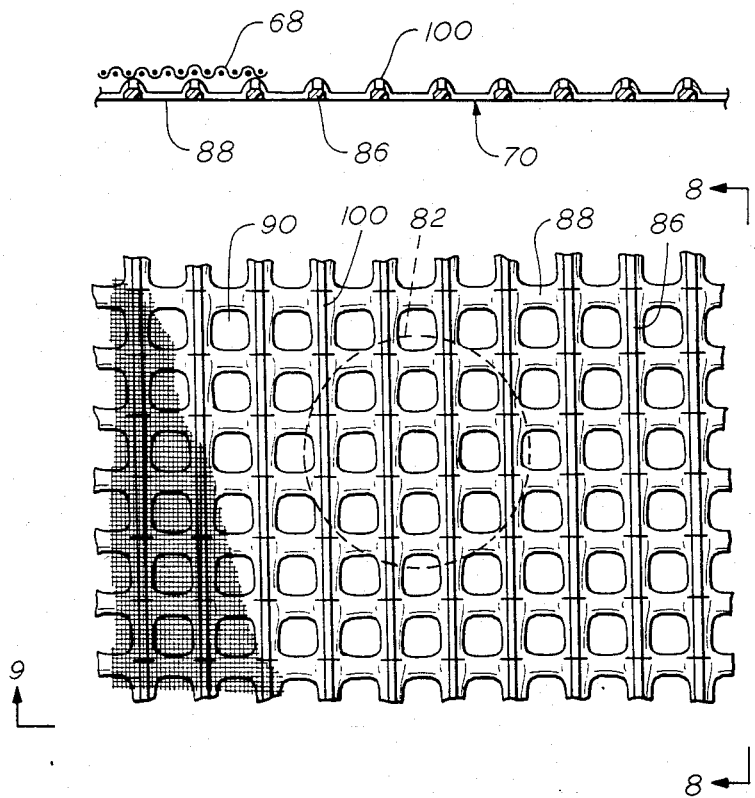
FIG. 10

DRILLING MUD CLEANING METHOD AND APPARATUS

This invention generally pertains to methods and apparatus to clean drilling mud for reuse and more particularly pertains to an improved method and integrated apparatus for continuously removing drill cuttings while retaining the solid particulates included in the original mud slurry, such as barites and clays.

BACKGROUND OF THE INVENTION

Every oil and gas well drilled utilizes mechanical apparatus to clean the drilling mud returned from the wellbore of the various drill cuttings, chips and particulates carried up and out of the wellbore as the well is being drilled. Recognized kinds of mechanical mud cleaning equipment has gradually been developed such as shale shakers, desanders, desilters and degassers.

An interesting background for such drilling muds may be found in the paper of J. Kelley, Jr.: "Drilling Fluids Selection, Performance and Quality Control", as published in the May, 1983 issue of the *Journal of Petroleum Technology*, pgs. 889–898. Also see the Handbook No. 7: "Mud Cleaners and Combination Separators" published by the Gulf Publishing Company, Book Division, Houston, Tex.

The present invention employs a combination of special vibratory screening and hydrocycloning steps which serve to replace the above identified mechanical separation units with a single integrated unit.

The nearest known prior art relating to apparatus utilized for performing the special screening steps above-identified are U.S. Pat. No. 3,900,628 to Stewart, 1955 French Patent No. 1,089,947 to Chauvin, and 1952 Netherlands Patent No. 70,820 to Voor.

The most pertinent prior art known for the apparatus employed for the hydrocycloning steps of the present invention is U.S. Pat. No. 4,019,980 to Beery.

OBJECTS OF THE INVENTION

An important object of the present invention is to provide a special cleaning process and integral apparatus which is highly efficient in screening out drill cuttings and related solids.

Another object of the present invention is to provide special screening apparatus which is both highly efficient and which has a comparatively long operating life without replacement.

Another object of the present invention is to separate the particulates which are original constitutents of the drilling mud from the fine drill cuttings and to restore such constitutents in the drilling mud for reuse.

Still another object of the invention is to provide integrated equipment which will operate efficiently and much less expensively than the multiple equipment presently in use.

SUMMARY OF THE INVENTION

In accordance with the present invention, a method is provided which continuously receives drilling mud returns from a well being drilled and distributes such mud returns evenly and effectively across an inclined primary screen. The primary screen is vibrated through a selected movement pattern and frequency to cause particles smaller than the primary screen openings to drop through the screen with the screened slurry and to cause particles larger than the primary screen openings to move down the screen incline and off the screen. With each vibrating cycle, the geometric shape of the primary screen openings is changed to free any such particles as might tend to lodge in a primary screen opening of fixed geometry. Concurrently with each vibrating cycle, the primary screen is impacted at many spaced apart impact locations to loosen particles tending to lodge. The screen slurry is accumulated then cyclonically separated in a hydrocyclone into a finally cleaned slurry and a thickened slurry including some original particles which were initially included in as constituents of the original slurry. The thickened slurry is mixed with a portion of the accumulated screened slurry to form a liquified slurry which is effectively distributed across an inclined gleaning screen. The gleaning screen is vibrated through selected movement pattern and frequency to cause the original constituent particles to drop through the gleaning screen openings with the gleaned slurry and to cause particles larger than the gleaning screen openings to move down the screen incline and off the screen. As with the primary screen, the geometric shape of the gleaning screen openings is changed through each vibrating cycle to free such particles as might tend to lodge in a gleaning screen opening of fixed geometry. The gleaning screen is concurrently impacted at many spaced apart impact locations to loosen particles tending to lodge. The finally cleaned slurry and the gleaned slurry are mixed together and returned to the well for reuse. As necessary, the finally cleaned mud may be degassed as a part of the cyclonic separation process.

Apparatus is provided as an integral unit through which the above outlined steps are performed. The integral unit includes special mud distribution apparatus and special screening apparatus which have improved features and functions as will become apparent with reference to the following detailed description.

BRIEF DESCRIPTION OF THE DRAWINGS

FIG. 6 is a partial sectional view taken the along the lines 6—6 of FIG. 2 and showing construction of the special screening apparatus utilized.

FIG. 7 is a detailed illustration of the screen fastening arrangement shown at the left of FIG. 6.

FIG. 8 is an enlarged section of the screen layers shown in FIG. 6 along with one of the support pillars shown in FIG. 6.

FIG. 9 is a section taken at right angles to FIG. 8 and showning the screen layers as supported in spaced apart relationship.

FIG. 10 is a plan view of a portion of the screen shown in FIG. 6 and FIG. 2.

DESCRIPTION OF THE PREFERRED EMBODIMENT

Figure 1:
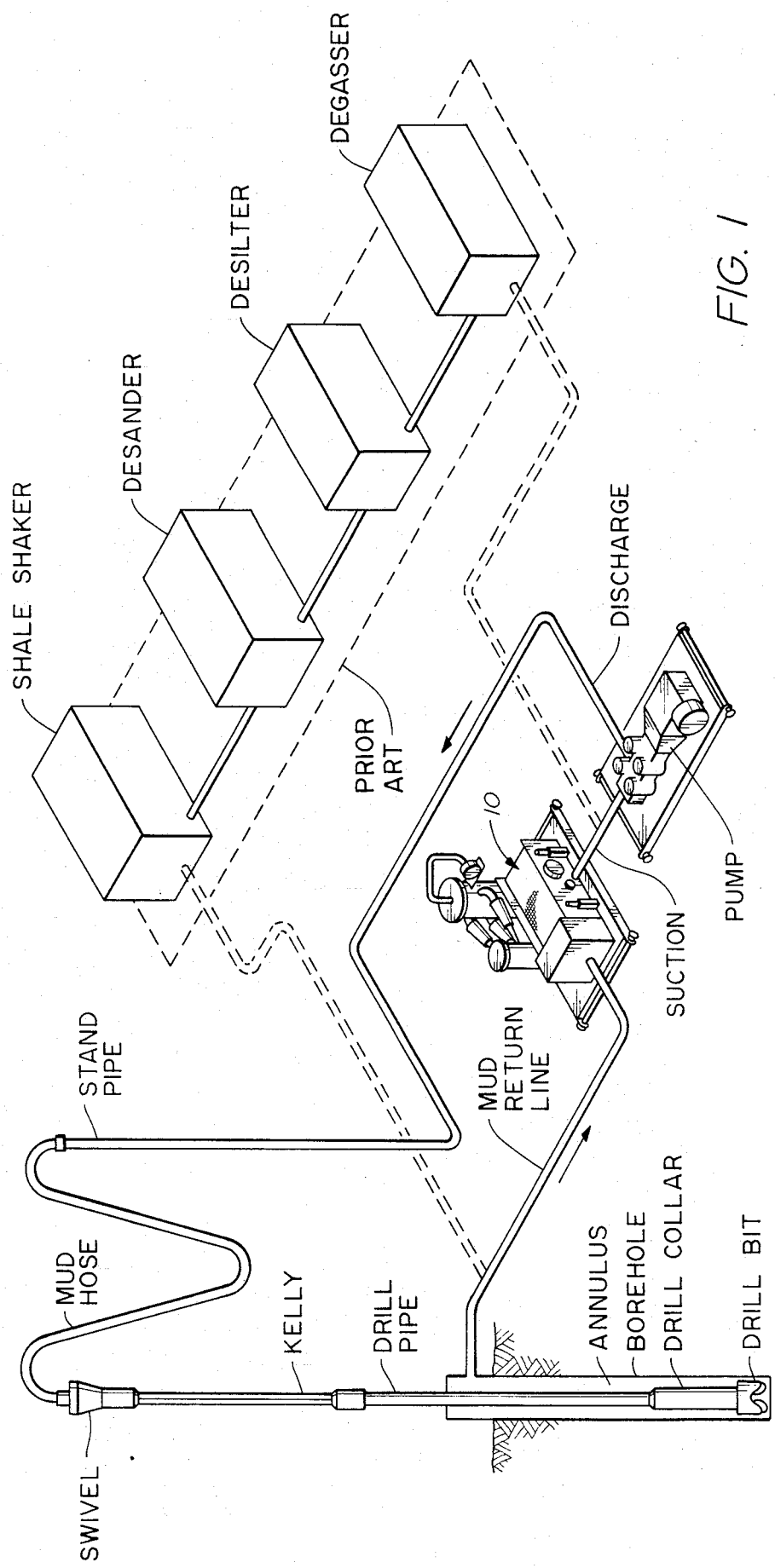
FIG. 1 is a perspective and schematic view generally showing a well being drilled with the drilling mud returns being cleaned with the method and apparatus of the present invention and, in contrast, the prior art apparatus commonly used to perform the same function.

Referring first to FIG. 1 there is schematically illustrated a representative well being drilled including a drill bit, drill collars and drill pipe in a borehole as identified by the legends. The drill pipe is connected through a Kelly to a swivel which is supported in a well derrick (not shown). A flexible mud hose extends from the swivel to a stand pipe extending up the side of the derrick which is connected to the discharge of a mud pump or pumps.

The pump moves drilling mud through the connection shown down through the drill pipe and drill collar and out the nozzels of the drill bit to lubricate the bit and to carry cuttings from the bit back up the wellbore annulus to the mud return line as shown. The mud return line containing the drill cuttings is fed into the apparatus 10 of the present invention. The output of apparatus 10 is connected into the suction of the pump to be recirculated as previously described. A mud pit or tanks (not shown) may be provided which serve in the mud circuit shown as accumulators as well as for other purposes such as settling.

Shown by dashed line piping connection in FIG. 1 is a typical prior art mud cleaning arrangement including a shale shaker, a desander, a desilter and a degasser, all identified by legends.

The terms "drilling mud", "mud", "drilling slurry", "drilling mud slurry", "mud slurry" and "slurry" as used are all terms having the same meaning.

Figure 5:
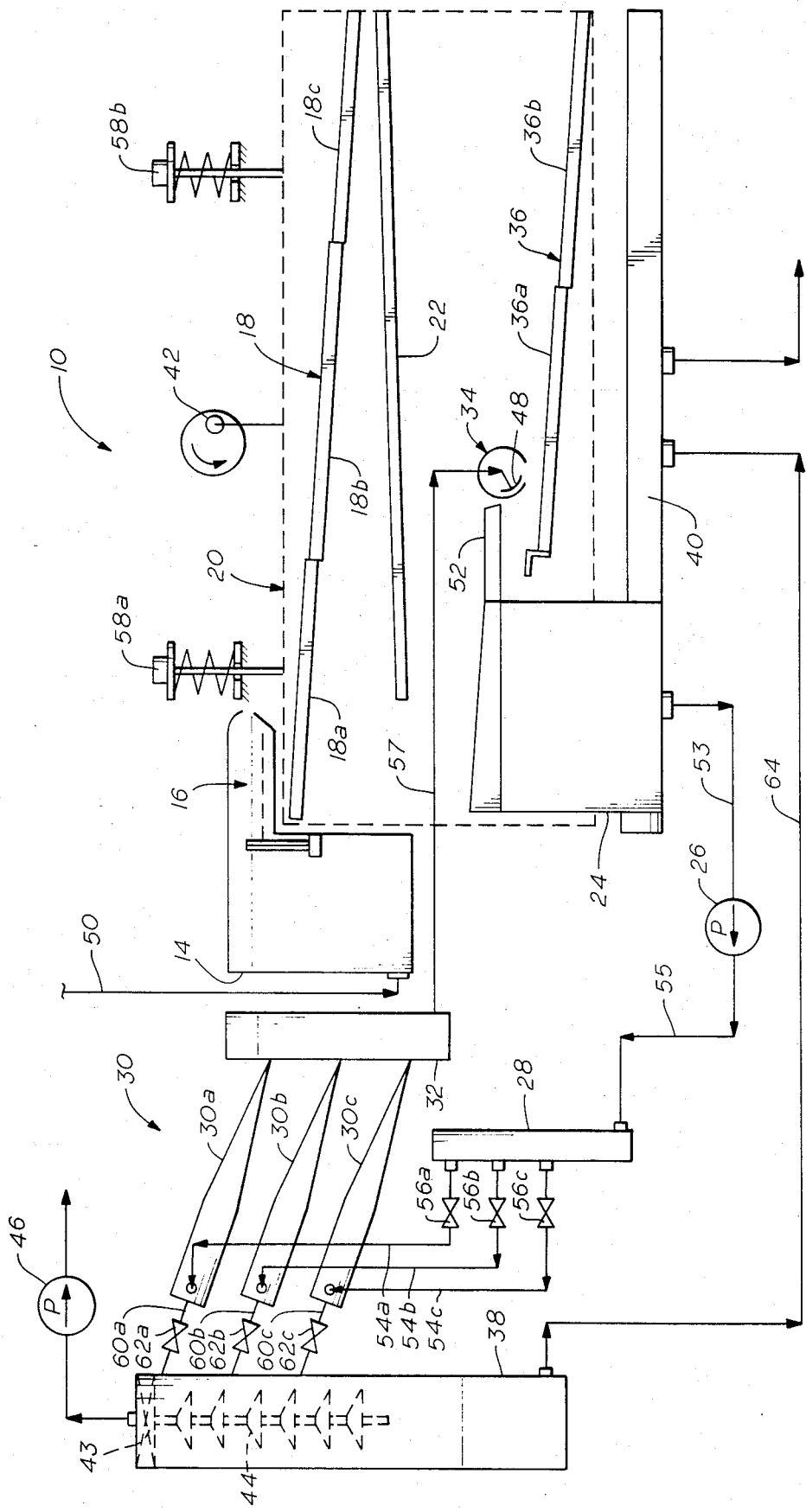
FIG. 5 is a schematic flow diagram to illustrate the method of the present invention along with the essential apparatus utilized in performing the method.

It appears that the functions of apparatus 10 will be best understood with reference to FIG. 5. The drilling mud return slurry coming from the well enters into the inlet mud box or tank 14 through a conduit 50. Within tank 14 the return slurry reaches a level sufficient to flow into a mud distributor apparatus 16 which evenly distributes the slurry and contained drill cuttings over the upper end of the primary screen 18. Mud distributor 16 will be later described in more detail.

A vibrator deck or housing 20, indicated as dashed lines, is vibrated through a selected movement pattern and frequency by the vibrator driver 42. The vibrator driver 42 may be a motor driven eccentric weight device which is adjustable to some extent in both amptitude and frequency by appropriate adjustment of the eccentric weights and of the rotational speed of the device. The vibratory movement imparted to vibrator housing 20 is generally sinusodal and the frequency may be varied from 1,000 to 1,600 cycles per minute, for example.

As shown in FIG. 5 the vibrator housing 20 carries and vibrates the primary screen 18, a screened slurry drain pan 22, a thickened mud slurry mixer 34 and a gleaning screen 36.

The mud return slurry distributed on primary screen 18 moves down the incline as shown in increments determined by the vibration amplitude, pattern and frequency of vibrator housing 20. As an example, the movement pattern may orbital with movement toward the down side of the screens on the downward direction of the movement.

Along the length of primary screen 18 the drilling mud filters through the openings of the primary screen 18 along with all solid particles small enough to pass through the mesh openings in the screen. All the mud returns have been separated before reaching the end of the primary screen 18. The solid drill cuttings and pieces which did not pass through the primary screen 18 are passed off the screen at the right of the drawing. The mud and particles passing through the primary screen 18, now referred to as screened slurry, flows down a screen slurry drain pan 22 by virtue of its incline and aided by the vibration from vibrator housing 20, into a screened slurry accumulator tank 24.

The liquid level of accumulator tank 24 is adjustably maintained such that nearly all the screened slurry will pass out the bottom of the tank but with a small balance of the screened slurry going through an overflow weir 52 for further use with a mud slurry distributor 34, as later described.

The screened slurry is pumped by a pump 26 through conduits 53 and 55 from the accumulator 24 under pressure into a hydrocyclone charge manifold 28. The pump 26 may be of the recessed impeller type where the impeller minimizes contact with the pump fluid and creates a swirling action which slowly builds up pressure in the pump casing and thereby enables a large variety of trash or cuttings to be pumped without damage to the pump. Also, this type of pump 26 does not vapor lock from entrained gases as can happen with regular centrifugal pumps.

The screened slurry pumped by pump 26 into the charge manifold 28 is distributed out to the inlets of a plurality of hydrocyclones 30a, 30b, 30c, etc. through conduits 54a, 54b, 54c, etc., as shown. The flow to each hydrocyclone is adjusted by means of valves 56a, 56b, 56c, etc. More detailed construction and operation of hydrocyclones of this type are disclosed in the referenced U.S. Pat. No. 4,019,980.

Briefly described, the screened slurry is injected tangently into the hydrocyclones 30 which imparts rotational movement of the slurry within each hydrocyclone body. Centrifugal force moves the more dense constituents of the slurry into contact with the walls of the body to form a thickened slurry which gradually flows the down the converging cone at the lower end of each hydrocyclone and into a hydrocyclone discharge manifold 32.

The lighter constituents of the screened slurry, which is substantially as clean as a drilling mud in its original unused state, is moved in a path up through the center and out the upper end of each hydrocyclone into clean mud accululator tank 38 through conduits 60a, 60b, 60c, etc., as shown. These conduits are flow regulated by the valves 62a, 62b, 62c, etc.

A demister array including a mist eliminator unit 43 along with a pipe and disks spaced along the pipe comprises a demister 44 which serves to remove air or gasses from the cleaned mud entering into the accumulator 38. An exhaust pump or blower 46 is connected to the upper end of accumulator 38 and pumps out such gas or air as separated by demister 44 from the mud.

The finally cleaned slurry accumulates in the bottom of the manifold accumulator 38 and flows by gravity through a conduit 64 through storage tank 40 and out for subsequent return and use in drilling the well.

A small amount of the slurry accumulation flows from accumulator 24 through the weir 52 into a mud slurry distributor 34. The distributor 34 distributes the thickened slurry coming from the hydrocyclone discharge manifold 32. The slurry coming through the weir 52 is distributed onto gleaning screen 36 just ahead of the flow from manifold distributor 34. The distributor 34 comprises a circular pipe appropriately slotted such that the thickened slurry drains out of the bottom evenly onto gleaning screen 36.

An adjustible baffle 48 is provided to regulate and evenly distributes the thickened slurry coming from the cyclone discharge 32. The thickened slurry is appropriately thinned by the slurry through wier 52 for best screening action across the gleaning screen 36.

The gleaning screen 36 is vibrated by the vibrator housing 20 and performs substantially the same as does the primary screen 18. The principal difference in structure between the screens 18 and 36 is that the screen 36 is of finer mesh and passes only smaller particles such as the constituents contained in the original drilling mud slurry. The slurry and particles passing through the gleaning screen 36 drop into the mud tank 40 to immediately become part of the finally cleaned liquid for reuse in the drilling operation.

Figure 2:
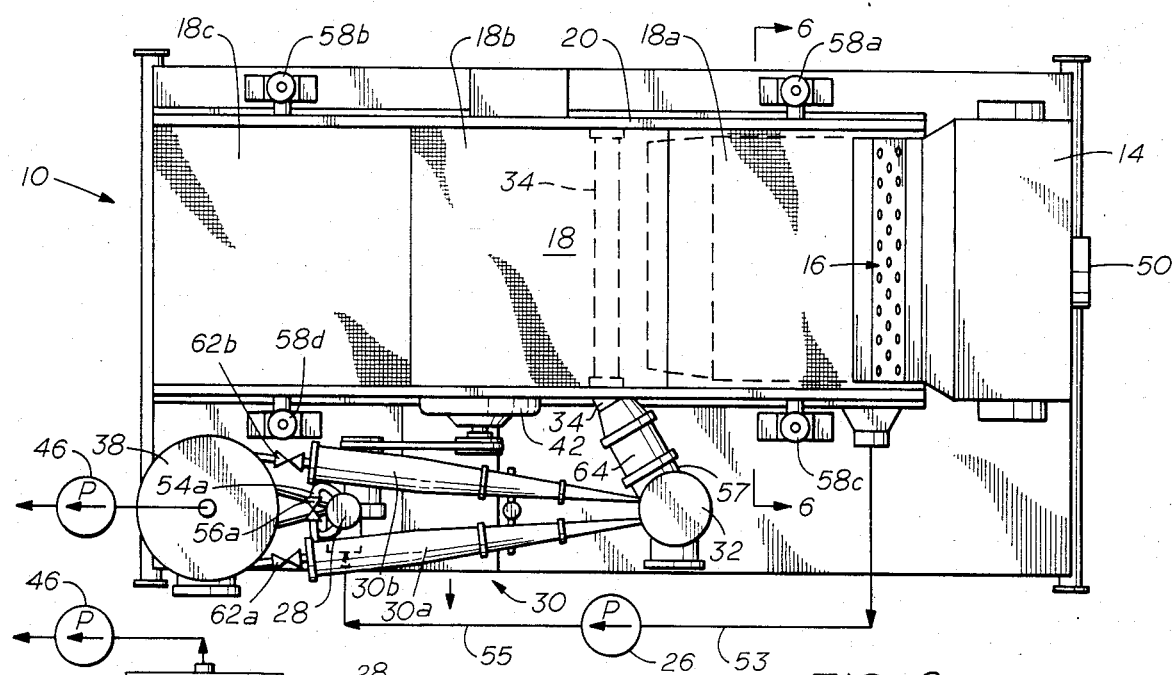
FIG. 2 is a partly schematic plan view of the integral unit of the present invention.
Figure 3:
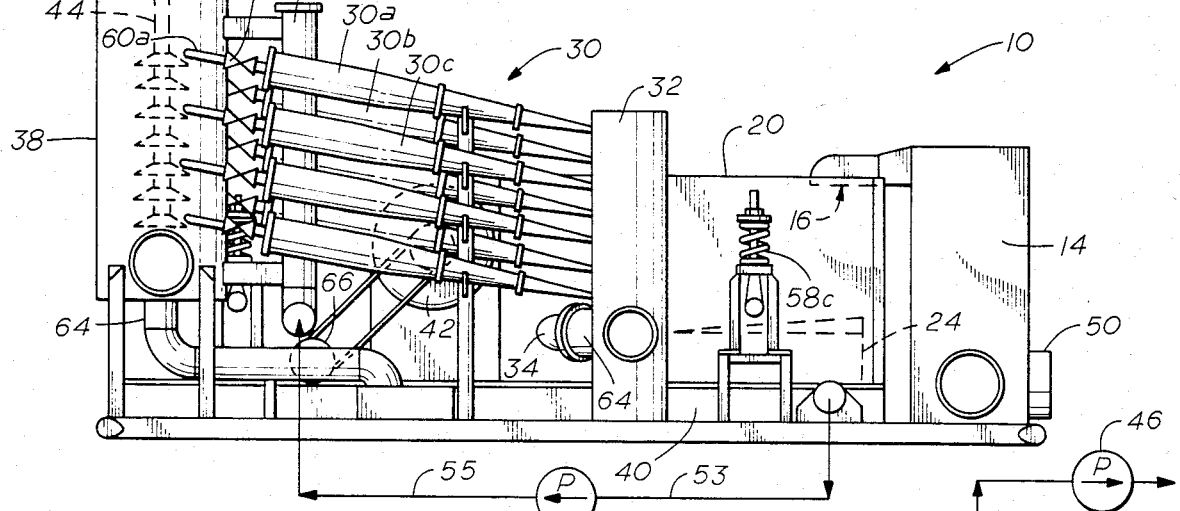
FIG. 3 is a partly schematic side elevation taken at 3—3 of FIG. 2.
Figure 4:
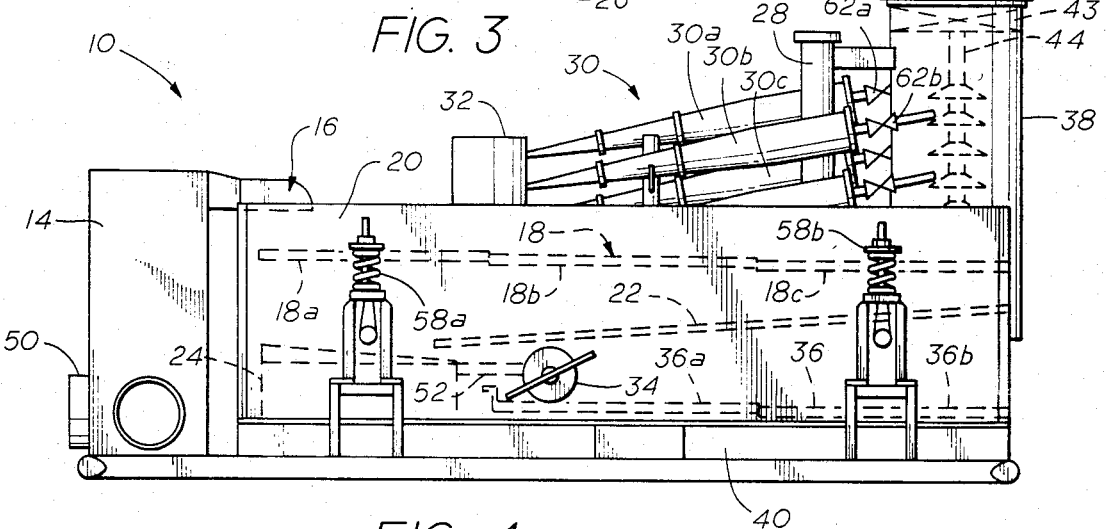
FIG. 4 is a partly schematic side elevation taken along the lines 4—4 of FIG. 2.

Turning now to FIGS. 2–4, the integral cleaning apparatus 10 is shown mounted on a skid 12. The inlet mud box or tank 14, the mud distributor 16 and the primary screen 18 are mounted as shown in FIG. 2 and the screen 18 is shown to comprise screen frames 18a, 18b and 18c.

The screened mud drain pan 22 is best shown in FIG. 4. The thickened slurry mixer 34 is shown connected through a flexible coupler 64 to the hydrocyclone discharge manifold 32 in FIGS. 2 and 3. The gleaning screen 36 comprising screen frames 36a and 36b are best shown in FIG. 4. The vibrator housing 20 shows in each of FIGS. 2–4 with the mountings 58a, 58b, 58c and 58d, all shown in FIG. 2. The vibrator driver 42 is shown in FIGS. 2 and 3 to be belt driven by an electrical motor 66. The pump 26, schematically shown in FIGS. 2 and 3, is piped in separately at the work site in the embodiment shown. As can be seen the pump 26 could be mounted on skid 12 if required.

Vibrator housing 20 is suspended from the rigid frame of the skid 12 by means of a plurality of flexible suspension units 58a, 58b, 58c, 58d, as shown in FIG. 5 and in FIGS. 2–4.

Now referring to FIGS. 6–10, the primary screen 18 and details thereof are shown. FIG. 6 is a section taken along 6—6 of FIG. 2. FIG. 7 is a detail taken at the left of FIG. 6 showing the structure and mounting of the screen in its frame. FIGS. 8–10 show more detail of the screen structure and support.

It is to be noted that the structure of the primary screen 18 as shown and described for FIGS. 6–10 is the same as the structure for and the operation of the gleaning screen 36. Accordingly, the screen 36 will not be further described in detail. A significant difference in screens 18 and 36, however, is that the mesh size of the primary screen is appreciably greater than the mesh size for the gleaning screen 36. As examples, the primary screen 18 may be in the range of 140–200 mesh with 150 mesh being a specific example while the mesh of the screen 36 may be in the range of 160–220 mesh with 200 mesh being a specific example.

As shown in FIGS. 6 and 8, the screen 18 may comprise a stainless steel metal screen 68 of 150 mesh, for example, which is supported on a plastic grid member 70 having regularly spaced openings defined on about ⅜" centers, for example, as shown in FIG. 10. The grid member 70 may be comprised of a tough and resilient elastomer such as polypropylene, for example, or some similar material which will be tough and elastic in the temperature range where the screen is used. Grid member 70 may be provided as an injection molding.

As best shown in FIG. 7, the screen 68 is fixed to be coincident with the support grid 70 by means of a metal channel member 72 which encloses the members at their coincident edges and is crimped and bent along its sides to firmly grip the screen 68 together with the grid member 70. The crimped member 72 may then be pulled into place against the sides 74 of a frame 76 by means of cleats which are drawn into place by bolt and nut fasteners 80 as shown.

Mounted in regularly spaced relationshp across each frame of screen 18 and supported from frame 76 are a plurality of small support members, such as posts or pillars 82 which may terminate at their upper end in a bulb or knob 84, as shown, with such knob providing improved stress distribution in support of the screen unit 18. As shown best though exaggerated in FIG. 6 the pillars 82 may be disposed with increasing height toward the center of the screen unit 18 so as to support the screen in slightly arched shape between the fasteners 80.

When assembled as shown in FIG. 6, the screen 68 and support grid 70 of screen unit 18 are tautly fixed between opposing fasteners 80 in the arch shape shown and are thereby firmly pulled into supportive contact with the supports 82 and knobs 84.

The molded grid 70 is comprised of support strands 86 and 88 which generally define the openings 90.

Of significant importance to the operability and efficiency of the screen 18, as hereinafter described, is a raised protrusion or stud 100 defined by the grid 70 at each intersection of the strands 86 and 88 as best shown in FIGS. 8–9.

In operation the frame 76 of screen unit 18 is vibrated by the vibrator housing 20 with movement in a pattern established through the vibrator housing 20 by the vibrator driver 42. The frequency of movement in terms of cycles per minute, is established by the vibrator driver 42. The movement of the screen 18 will be generally sinusodal and the movement pattern will generally be a eliptical and/or orbital, depending upon selection and adjustments of the driver 42, the flexible supports 58 and the mass of the vibration housing 20 and contents (including the mass of the mud slurry being processed through the vibrator housing).

Referring to FIG. 6, the eliptical or orbital movement of the frame 76 is transmitted upwardly through pillars 82 to the screen unit 18 and to any drilling slurry and cuttings supported by the screen unit 18.

The knobs 84 move up to also move up the screen 68 and support grid 70. Any drilling slurry and cuttings carried by the screen 18 are also moved up at that instant. The inertia of the screen, as well as the load of slurry and cuttings above, stretch the support grid 70 and the screen 68 downwardly in two dimensions among the knobs 84 into a curved shape somewhat like a circus tent supported between a grid of support poles. This stretch changes the shape of the mesh openings of screen 68.

Then, as the upward movement of the frame 76 and knobs 84 cease and quickly reverse to a downward movement, this stretch and curvature as above described, ceases and the mesh and grid are actually pulled down sufficiently rapid to lose contact with the slurry and cuttings riding on top. There is a rapid downward descent of the knobs 84, of the grid 70 and the screen 68. A flapping of the screen unit 18 occurs, which tends to part screen 68 from grid 70 and grid 70 from knobs 84. This downward movement tends to restore the mesh opening shape of screen 68.

At the lower end of the downward travel the movement of the knobs 84 downwardly abruptly change from a downward movement back to an upward movement along the path of oscillation as previously described. The support grid 70 and screen 68, which have been effectively *following* the knob 84, abruptly impact the knob 84 followed by the subsequent impact of the drilling slurry and cuttings to reestablish the tension and stretched configuration above described. It can be seen that there may be subsequent slapping of the materials involved. First the grid 70 tends to slap the knob 84. Secondly, the screen 68 tends to slap the grid 70. Thirdly, the slurry and cuttings slap the upper face of the screen 68.

Now, on a smaller scale, the mesh 68 is supported by the resilient grid 70, which is supported and suspended from the resilient studs 100 as previously described for grid 70 and knob 84. On a much more miniature scale, the mesh 68 will stretch between such studs as the studs 100 and supporting grid 88 are raised by the knobs 84, and tend to flap away from such studs 100 as the mesh 68 tends to separate from the grid 70 on downward travel of the screen 18. At the bottom of the path the previously mentioned slap occurs between the knobs 100 and the screen 68 as does the slap between the grid 70 and the knobs 84.

As the mesh of the screen 68 is placed in two dimensional tension from studs 100, the shape of the mesh openings of screen 68 are urged to be repeatedly changed from a substantially square or rectangular shape to a diamond or trapezoidal shape, for example, and such change occurs upon each cycle of the vibratory movement, as previously mentioned.

Should there be a particle of sizes tending to lodge in a mesh opening of the screen 68, the rapid upward and downward movement, coupled with the change in geometry of these mesh openings, and further coupled with the slapping action of the knob 84 against the mesh 70, the studs 100 against the screen 68, and the screen 68 against the drilling mud and cuttings above, has been found to greatly facilitate keeping all the openings of the screen 68 clear for passage of both slurry and particles. This distortion and the slapping combination of forces also have proven to greatly facilitate passage of the classified materials through the screen in relatively much shorter order.

The support, as above described, coupled with the resilience of the support grid 70 and the resilience of the studs 100 against the mesh of the screen 68, is giving the screen 68 a much longer operating life than comparative screens as used with prior art shale shakers and the like. As an example, screens installed on experimental apparatus as shown in FIGS. 2-4 have survived continuous service up to 40-42 days before receiving enough wear and tear to require replacement. Such service life is considered almost phenomenal as compared to prior art drilling mud screens.

Figure 11:
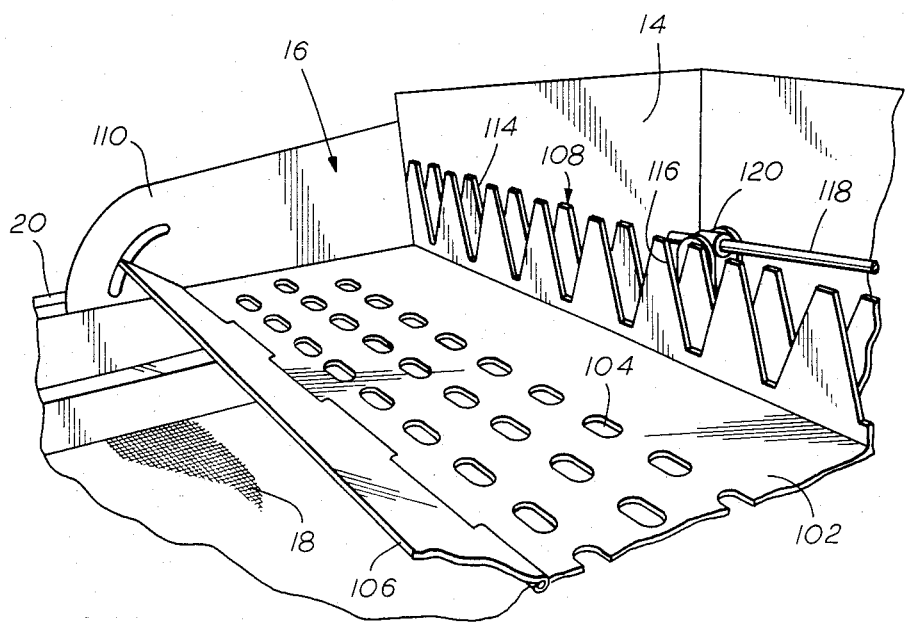
FIG. 11 is a perspective view of the mud distribution apparatus.
Figure 12:
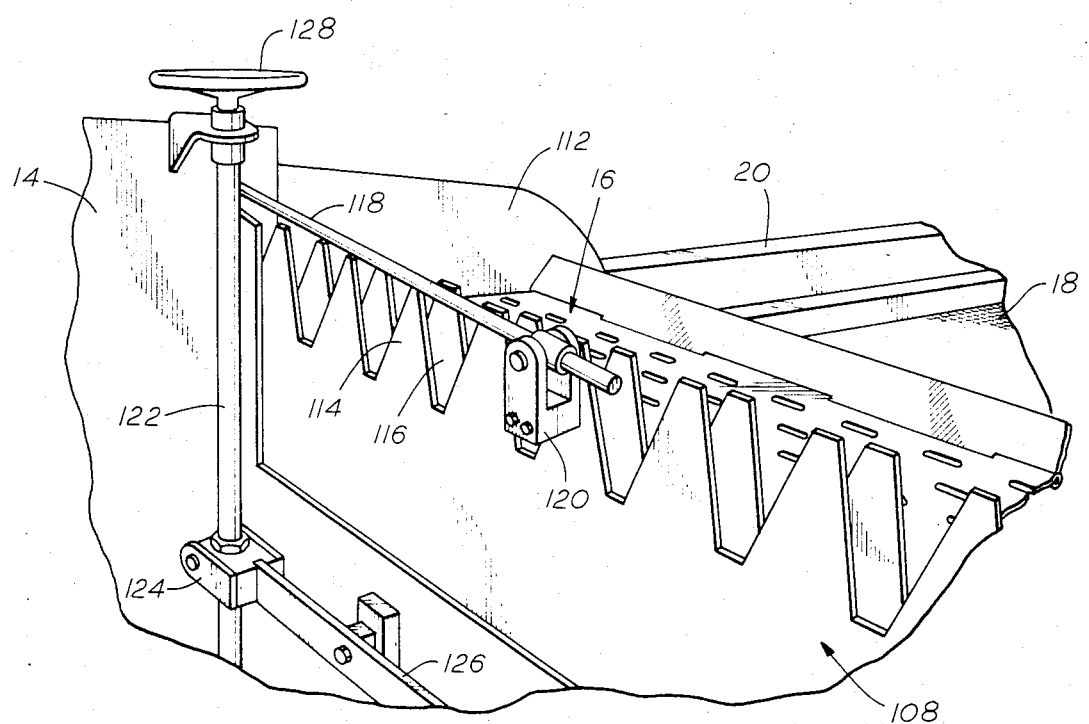
FIG. 12 is a different perspective view of the mud distribution apparatus.

Referring now to FIGS. 11 and 12, the slurry distributor 16 is illustrated in perspective from opposite sides of the mud tank 14 and the vibrator housing 20. As shown the distributor 16 is mounted with the tank 14 and is supported free of the vibrator housing 20.

The distributor 16 includes a distribution table 102 in which is defined a plurality of regularly spaced drain openings 104. An adjustable fluid level dam 106 is attached to the downscreen side of the floor 102 to accomodate a liquid level on the table 102 as the liquid is flowing through the holes 104.

An adjustable weir 108 is mounted to the side of tank 14 to regulate the flow of slurry into the area of table 102 with the flow rate through the weir and the flow rate of the slurry through the openings 104 serving to establish the level of slurry on the table 102. Mounted at the sides of the table 102 between the dam 106 and the weir 108 are enclosure walls 110 and 112 which complete the enclosure of the slurry on the distribution table 102.

The weir 108 is comprised of horizontally disposed weir plate 114 and 116 with each of said weir plates defining the sides and bottoms of a plurality of spaced apart flow slots as shown. The weir plate 114 is horizontally adjustable with respect to weir plate 116. As shown in FIGS. 11 and 12, a threaded control rod 118 connected through a threaded clevis assembly 120 serve to adjust the horizontal travel of the weir plate 118. A control handle or wheel (not shown) is mounted outside of tank 14 for rotation of rod 116.

The weir plates 114 and 116 are jointly mounted for vertical adjustment. The vertical adjustment is made by means of a threaded control rod 122 connected through a threaded clevice assembly 124 with the clevice assembly being attached to a bracket 126 which supports the weir plates 114 and 116. A control wheel 128 serves to facilitate rotation of the control rod 122 as shown in FIG. 12.

In operation, horizontal adjustment of the weir plate 114 with respect to the weir plate 116 controls the effective area of the slots defined by the respective plates. The effective area controls the flow rate of slurry out of tank 14 onto the table 102.

Adjustment of the control rod 122 jointly raises or lowers weir plates 114 and 116. This adjustment effectively adjusts the head at which the mud flows over onto plate 102 and, combined with the flow into tank 14 and adjustment of the effective flow area, provides a combined flow adjustment. With appropriate adjustment of the dam 106 and the effective flow area and height of weir plates 114 and 116, a constant level of slurry may be maintained on the table 102 for even distribution of the slurry across the screen 18. This is an important feature and is most capably facilitated by the structure as shown.

The method and apparatus of this invention has been described with respect to the preferred embodiment as herein disclosed. It is to be understood, however, that modifications and changes may be made to the invention without departing from the spirit of the invention as specified and claimed in the appended claims. Accordingly, the invention is claimed in any of its forms or modifications as come within the purview of the appended claims.

What is claimed is:

1. A method of continuously cleaning a drilling mud slurry within an intergral and portable apparatus, comprising:
    (a) receiving a drilling mud returns slurry containing particulate solid pieces;
    (b) distributing said slurry across an inclined primary screen;
    (c) vibrating said primary screen through a selected movement pattern, cycle and frequency to cause particles smaller than the primary screen openings to drop through the screen with the screened slurry and to cause other solids larger than said primary screen openings to move down the screen incline and off the primary screen;

(d) cyclicly changing the geometric shape of the primary screen mesh openings through each cycle of the movement pattern to free such particles as might tend to lodge in a primary screen opening of fixed geometry while concurrently impacting the primary screen at many spaced apart impact locations to loosen particles tending to lodge;

(e) receiving said screened slurry and remaining particles as pass through said primary screen into an accumulation of the screened slurry.

2. The method of claim 1 further including the steps of:

(a) cyclonically separating most of said accumulation into a finally cleaned slurry and a thickened slurry including some original particles included in the original slurry;

(b) mixing said thickened slurry with the remainder of said slurry accumulation to form a liquified slurry;

(c) distributing said liquified slurry across an inclined gleaning screen;

(d) vibrating the gleaning screen through the selected movement pattern, cycle and frequency to cause the original particles to drop through the gleaning screen openings with the gleaned slurry and to cause the particles larger than the gleaning screen openings to move down the screen incline and off the gleaning screen;

(e) cyclicly changing the geometric shape of the gleaning screen mesh openings through each cycle of the movement pattern to free such particles as might tend to lodge in a gleaning screen opening of fixed geometry while concurrently impacting the gleaning screen at many spaced apart impact locations to loosen particles tending to lodge; and, (f) mixing said gleaned slurry with said finally cleaned slurry for reuse.

3. The method of claim 1 including degassing the finally cleaned slurry before reuse.

4. The method of claim 1 wherein said impact locations are regularly spaced across the length and width of a screen.

5. The method of claim 1 wherein said primary screen is provided of mesh having 140 to 200 openings per inch (140-200 mesh).

6. The method of claim 2 wherein said gleaning screen is provided of mesh having 160 to 220 openings per inch (160-220 mesh).

7. The method of claim 1 wherein up to 800 gallons per minute of cleaned slurry may be produced for reuse.

8. The method of claim 2 wherein said primary screen and said gleaning screen are provided of stainless steel.

9. The method of claim 2 wherein said gleaning screen is provided of mesh having 160 to 220 openings per inch (160-220 mesh).

10. In an integral and portable vibrating screen apparatus adapted to remove liquid and selected particulated solids from a mixture including pieces of larger size, the combination comprising:

(a) housing means adapted to be vibrated through cycles of a selected frequency and through a movement of selected pattern between an upper position and a lower position;

(b) a supporting screen frame mounted within said housing to be vibrated by said housing and supporting an elongate screen means at a selected angle from the horizontal, said screen means comprising:

(1) upright support means mounted on said frame in a spaced apart array across the area of said screen with each of said support means defining a curved support knob at its upper end;

(2) an integrally formed elastomeric grid member mounted across the working area of said frame and vertically supported by said knobs.

(3) said grid member defining spaced apart first strands joined at substantially right angles to spaced apart second strands with a resilient, upwardly protruding stud formed at each intersection of said first strands and said second strands to form a spaced apart array of protruding studs;

(4) a woven metal screen of selected mesh per inch mounted across the working area of said grid member and vertically supported by said studs; and (5) screen retainer means clamping coincident edges of said grid member and said screen together as an operating screen unit and retaining said operating unit in a condition of selected tension across the working area of said screen for said grid member to be vertically supported by said knobs and for said screen to be vertically supported by said studs;

(c) vibrator means for vibrating said screen means through said housing means and said screen frame to cause cyclic vibration of said screen means through said cycles of said frequency and said movement;

(d) said vibrator means having means to modify the structure of said screen unit during a mud screening operation including:

(1) means draping said screen unit into a first curvature between said knobs beginning with the upward movement of each cycle of vibration as caused by the inertia of said screen unit and the mass of the mud slurry;

(2) means further draping said screen unit into a second curvature between said studs, beginning with said upward movement;

(3) said first curvature and said second curvature thereby changing the shape of each mesh opening of said screen during each cycle of said cycles;

(4) means flapping said screen unit beginning with the downward movement of each cycle of said vibration as caused by said inertia to thereby urge said mud slurry to part from said screen unit; said screen to part from said studs of said grid member; and said grid member to part from said knobs with said flapping resulting in the return of the initial shape of said openings; and (5) means slapping said screen unit against said knobs and said screen against said studs and said mud slurry against said screen through the end of said downward movement, tending to impart a jarring action, and to thereafter repeat said draping action as upward movement begins.

11. The apparatus of claim 10 wherein said frequency is of range between 1000 and 1600 cycles per minute.

12. The apparatus of claim 10 wherein said screen is provided of stainless steel.

13. The apparatus of claim 10 wherein said screen is provided in a range of 140–220 mesh per inch.

14. The apparatus of claim 10 wherein said grid member is provided of polypropylene.

15. The apparatus of claim 10 wherein said movement pattern is generally orbital and moving down toward the down sloping end of said screen.

16. Slurry distribution apparatus included in the combination of claim 10 comprising:
   (a) a horizontally disposed slurry distribution table means defining a plurality of evenly distributed slurry drain openings;
   (b) enclosure means disposed about the perimeter of said table to maintain a depth of slurry on said table of said drain openings, including:
      (1) a horizontally adjustable dam on a downstream side of said table for accomodating said slurry depth;
      (2) an inflow weir means on the upstream side of said table for regulating the flow of slurry onto said table and for evenly distributing slurry flow across the area of said table; said weir means comprising:
         (i) a pair of horizontally disposed weir plates extending together across said upstream side of said table with said weirs having a plurality of spaced part fingers which jointly define the sides and bottoms of a plurality of spaced apart flow slots;
         (ii) horizontal adjustment means connected to horizontally move the fingers of one of said weir plates relative to the fingers of the other of said weir plates and thereby to change the width and effective flow area of said flow slots; and,
         (iii) vertical adjustment means connected to vertically move both of said weir plates together relative to said table and thereby to change the effective height of the bottoms of said plurality of spaced apart flow slots.

17. A drilling mud screen means adapted to be incorporated into mud screening apparatus and vibrated through vibration of selected frequency and through a cyclic movement of selected pattern comprising:
   (a) a woven metal screen of selected mesh per inch mounted across the working area of a grid member and vertically supported by many studs protruding upwardly from said grid member;
   (b) vibrator means for vibrating said screen means through cycles of said frequency;
   (c) said metal screen, said studs on said grid member and said vibrator means cooperating to comprize means for:
      (1) draping said metal screen into a curvature between said studs beginning with upward movement,
      (2) said curvature operating to change the shape of each mesh opening of said metal screen,
      (3) flapping said screen means beginning with a downward movement of each cycle of said vibration as caused by inertia to thereby urge said mud slurry to part from said metal screen; and said metal screen part from said studs of said grid member; and
      (4) slapping said metal screen against said studs and said mud slurry against said screen through the end of said downward movement operating to impart a jarring action, and
      (5) repeating said draping action as upward movement begins.

18. The apparatus of claim 17 wherein said frequency is of range between 1,000 and 1,600 cycles per minute.

19. The apparatus of claim 17 wherein the screen is provided of stainless steel.

20. The apparatus of claim 17 wherein the screen is provided in a range of 140–220 mesh per inch.

21. The apparatus of claim 20 wherein said grid member is provided of polypropylene.

22. The apparatus of claim 17 wherein said movement pattern is generally orbital and moving down towards the down sloping end of said screen.

23. The apparatus of claim 17 wherein said metal screen is stainless steel supported by an integral elastomeric support grid member.

24. The apparatus of claim 19 wherein the screen is provided in a range of 140–220 mesh per inch and wherein said grid member is provided of polypropylene.

25. The apparatus of claim 22 wherein said frequency is of range between 1,000 and 1,600 cycles per minute.

26. The apparatus of claim 25 wherein the screen is provided in a range of 140–220 mesh per inch and wherein said grid member is provided of polypropylene.

* * * * *